Patented Feb. 3, 1953

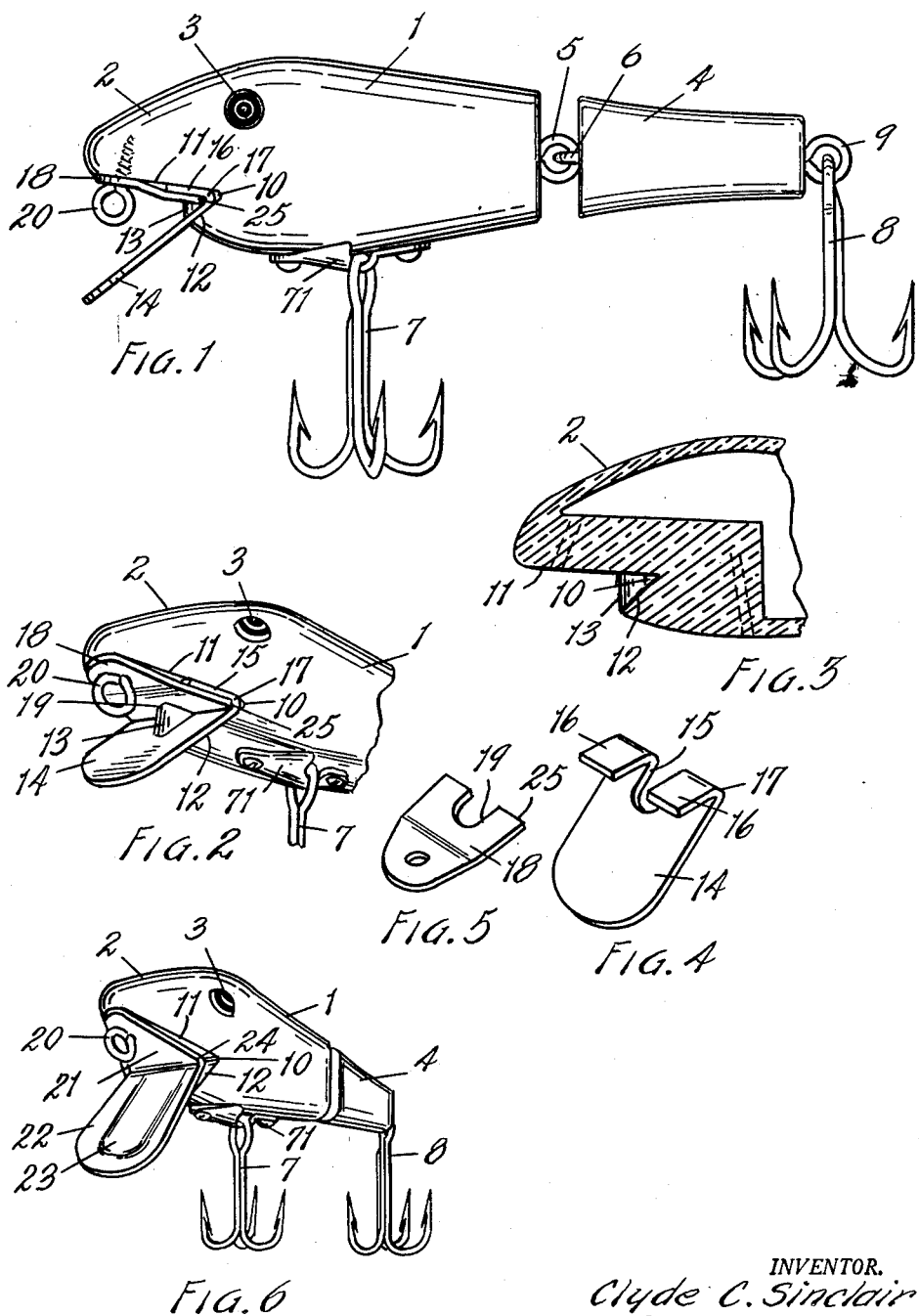

2,627,136

UNITED STATES PATENT OFFICE 2,627,136

FISH BAIT OR LURE

Clyde C. Sinclair, Paw Paw, Mich., assignor to Paw Paw Bait Company, Paw Paw, Mich.

Application June 2, 1949, Serial No. 96,633

5 Claims. (Cl. 43—42.47)

This invention relates to improvements in fish bait or lure.

The main objects of this invention are:

First, to provide a fish bait or lure which has a zigzag or wriggling movement simulating a swimming movement when it is drawn through the water.

Second, to provide a bait or lure having these advantages including a forwardly inclined blade which is securely attached by means of a single screw and may be easily detached and replaced for purposes of renewal or for changing blades of different sizes.

Third, to provide a structure embodying these advantages which is very attractive in appearance and efficient in use.

Objects relating to details and economies of the invention will appear from the description to follow. The invention is pointed out in the claims.

A preferred embodiment of the invention is illustrated in the accompanying drawings, in which:

Fig. 1 is a side elevational view of a bait or lure embodying my invention.

Fig. 2 is a fragmentary front perspective view.

Fig. 3 is an enlarged fragmentary longitudinal section of the front body member with the blade and hook removed, the member illustrated being hollow and formed of plastic.

Fig. 4 is a perspective view of the blade member or element.

Fig. 5 is a perspective view of the clamping plate.

Fig. 6 is a perspective view of a modified form or embodiment of my invention.

In the accompanying drawing the structures illustrated are considerably enlarged as compared to the commonly used sizes of commercial baits. The embodiment of my invention illustrated comprises a front body member 1 having a head portion 2 provided with an eye simulating part 3. The front body member is generally rearwardly tapered. The rear body member 4 is also rearwardly tapered and is in general complementary in shape to the rearwardly tapered portion of the front body member. The front end of the rear body member is swingably articulated to the rear end of the front body member by means of the screw eyes 5 and 6. This allows free swinging movement of the rear body member which is an important feature in view of the movement which is imparted to the front body member as it is drawn or propelled through the water.

In the embodiment illustrated the front body member has a hook 7 swingably attached to its under side by the fastener 71 and the rear body member has a hook 8 swingably attached to the rear thereof by the screw eye 9. The head portion of the front body member has an undercut therein providing a forwardly facing V-shaped recess 10, the top wall 11 of which is disposed substantially horizontally and extends beyond the bottom wall 12 for a substantial distance. The recess in its entirety is disposed in the lower half of the body member. A centrally positioned vertical rib 13 extends from the top to the bottom wall and is formed integrally with the front body member.

The blade 14 is seated upon the bottom wall 12 of the recess and is notched at 15 to receive the rib 13. The blade 14 has angularly disposed arms 16 at the sides of the slot or notch 15, these arms being disposed against the upper wall of the recess. The angle 17 constituted by the blade and its arms seats in the recess as is shown in the drawing. The blade is retained by the clamping plate 18 which is notched at 19 to receive the rib 13 and is secured in clamping overlapping relation to the arms 16 by means of the screw eye 20 which also serves as a line attaching element. The blade is of substantial width and projects forwardly and downwardly from the body member. It will be noted that the blade extends forwardly of the line attaching eye 20 which adds to the movement of the bait when it is drawn through the water.

With the parts thus arranged the bait when propelled or drawn through the water has a very desirable wriggling or zigzag swimming movement which appears to be highly advantageous in attracting fish. The zigzag or swimming movement of the front body member causes a swinging movement of the rear body member further simulating the movement of a fish or other swimming object.

In the commercial embodiments of my invention illustrated the body parts are chambered and formed of plastic as illustrated in Fig. 3.

In the embodiment shown in Fig. 6 the rib 13 is omitted from the recess and the arm 21 of the blade is extended to receive the screw 20. This eliminates the use of the clamping plate. The blade 22 of this embodiment is preferably provided with a longitudinal reinforcing rib 23. The blade and its arm are so disposed relative to each other as to fit upon the walls of the recess in supported relation thereto. The angle 24 at the juncture of the arm 21 and the blade 22 fits into the angle of the recess so that a single screw is effective in supporting the blade and preventing swinging movement thereof.

In the embodiment of Figs. 1 to 4, inclusive, the rib adds to the security of the blade mounting and reinforces the blade supporting projection. In this embodiment the inner end 25 of the attaching plate 18 engages within the angle resulting from the angular positioning of the arms 16 relative to the blade and this prevents the swinging movement of the blade. It will be understood that the blades are sometimes subjected to quite severe stress as a result of their engagement with weeds or other snagging material. In both embodiments of my invention the blades are easily mounted or easily attached or released and if desired blades of different sizes may be used, the size of the blades having considerable bearing on the degree of movement of the bait as it is propelled through the water. The blade and head portion of the front body member are so related as to simulate an open mouth.

I have not attempted to illustrate or describe other embodiments of my invention as it is believed that this disclosure will enable those skilled in the art to embody or adapt my invention as may be desired.

Having thus described my invention, what I claim as new and desire to secure by Letters Patent is:

1. A fish bait or lure comprising a rearwardly tapered front body member, a rearwardly tapered rear body member, the front end of the rear body member being connected to the rear end of the front body member, the head portion of the front body member having an undercut providing a forwardly facing V-shaped recess having a central vertical rib at the bottom thereof, the upper wall of the recess being extended into a flat downwardly facing surface extending to the tip of the body member, a blade notched to receive said rib disposed on the lower wall of the recess to project downwardly and forwardly therefrom and having angularly disposed arms engaging the upper wall of the recess, a clamping plate notched to receive said rib disposed on the upper wall of the recess with its rear end in overlapping engagement with said blade arms, an attaching screw securing said plate in clamping engagement with said blade arms and coacting with said rib in supporting said blade, the screw having an eye constituting a line attaching element, and hooks, one hook being secured to the under side of the front body member at the rear of the blade and the other to the rear end of the rear body member.

2. A fish bait or lure comprising a front body member, a rear body member, the front end of the rear body member being connected to the rear end of the front body member, the head portion of the fornt body member having an undercut providing a forwardly facing V-shaped recess, the upper wall of the recess being extended forwardly beyond the lower wall, a blade disposed on the lower wall of the recess to project downwardly and forwardly therefrom and having an angularly disposed arm engaging the upper wall of the recess, a clamping plate disposed on the upper wall of the recess with its rear end in overlapping engagement with said blade arm, and means for securing said plate in clamping engagement with said blade arm, and a hook attached to one of said body members.

3. A fish bait or lure comprising a body member having an undercut on its under side at its front end providing a forwardly facing V-shaped recess having a central vertical rib at the bottom thereof, the upper wall of the recess being extended into a flat downwardly facing surface, a blade notched to receive said rib disposed on the lower wall of the recess to project downwardly and forwardly therefrom and having angularly disposed arms engaging the upper wall of the recess, a clamping plate notched to receive said rib disposed on the upper wall of the recess with its rear end in overlapping engagement with said blade arms, and means for securing said plate in clamping engagement with said blade arms and coacting with said rib in supporting said blade.

4. A fish bait or lure comprising a body member having an undercut at its front end providing a forwardly facing V-shaped recess, the upper wall of the recess being extended forwardly beyond the lower wall, a blade disposed on the lower wall of the recess to project downwardly and forwardly therefrom and having an angularly disposed arm engaging the upper wall of the recess, a clamping plate disposed on the upper wall of the recess with its rear end in overlapping engagement with said blade arm, and means securing said plate in clamping engagement with said blade arm.

5. A fish bait or lure comprising a body member having a forwardly facing V-shaped undercut recess at the front end thereof, a blade disposed on the lower wall of the recess to project downwardly and forwardly therefrom and having an angularly disposed arm at its inner end engaging the upper wall of the recess, the angled portion constituted by the blade and its arm being in supporting engagement with the bottom of the recess, said body member having a rib extending between and integral with said top and bottom walls and projecting forwardly from the inner end of the recess and centrally positioned between the opposite sides of the body member, said blade having a slot extending forwardly from the inner end thereof and receiving said rib, means for clamping said arm against the upper wall of the recess acting to secure the blade upon the lower wall of the recess, and a hook secured to the body member at the rear of the blade.

CLYDE C. SINCLAIR.

REFERENCES CITED

The following references are of record in the file of this patent:

UNITED STATES PATENTS

| Number | Name | Date |
|---|---|---|
| D. 147,901 | Findlay | Nov. 18, 1947 |
| 1,499,819 | Goble | July 1, 1924 |
| 1,615,803 | Pflueger | Jan. 25, 1927 |
| 1,846,355 | Pemberton | Feb. 23, 1932 |
| 2,069,972 | Schroeder | Feb. 9, 1937 |
| 2,441,302 | Watkin | May 11, 1948 |